United States Patent

[11] 3,540,688

| [72] | Inventor | Antonius Maria Schulte |
| --- | --- | --- |
| | | 11 Villapack, Delden, Netherlands |
| [21] | Appl. No. | 753,459 |
| [22] | Filed | Aug. 19, 1968 |
| [45] | Patented | Nov. 17, 1970 |
| [32] | Priority | Aug. 16, 1967 |
| [33] | | Netherlands |
| [31] | | No. 6711241 |

[54] SUPPORTING MECHANISM FOR AN OBJECT
12 Claims, 8 Drawing Figs.

[52] U.S. Cl. .................................................. 248/358,
248/15, 248/18, 267/1
[51] Int. Cl. ...................................................... F16f 15/00
[50] Field of Search .......................................... 248/358,
12, 13, 18, 20, 21, 119, 2; 267/121, 21, 151;
188/Inq

[56] References Cited
UNITED STATES PATENTS
2,685,425  8/1954  Wallerstein ................... 248/358

| 3,129,836 | 4/1964 | Frevel ........................... | 248/358X |
| 3,131,903 | 5/1964 | Quick ............................ | 248/358 |
| 3,155,361 | 11/1964 | Balan ............................ | 248/358 |
| 3,185,415 | 5/1965 | Thorn ............................ | 248/21 |
| 3,246,890 | 4/1966 | Ormond ......................... | 267/1 |

FOREIGN PATENTS
1,100,123  1/1968  Great Britain ................  248/20

Primary Examiner—Roy D. Frazier
Assistant Examiner—J. Franklin Foss
Attorney—Frank R. Trifari ABSTRACT: A mechanism for supporting an object against shock features six spring and damper support members. Two of the members are connected to the top of the object at the axis of the principle moment of inertia. The remaining four members are connected to the bottom of the object along four sides of a tetrahedron. The two unused sides are parallel to the bottom side of the object and the support plate respectively. The moment of inertia axis passes through the middle of the unused sides.

INVENTOR
ANTONIUS M. SCHULTE
BY
AGENT

INVENTOR
ANTONIUS M. SCHULTE
BY

AGENT

Patented Nov. 17, 1970

INVENTOR
ANTONIUS M. SCHULTE

BY

*Frank R. Trifari*

AGENT

SUPPORTING MECHANISM FOR AN OBJECT

This invention relates to a supporting mechanism for an object arranged to suppress substantially the transmission of shocks and vibrations to that object, said mechanism comprising a number of elastic arrangements each of them so arranged as to supply a force (hereinafter called elastic force) that satisfies the laws of elasticity, as well as six damping arrangements, each of them so arranged as to supply a damping force, said elastic and damping forces being exerted between a universally rotatable joint connecting the arrangement supplying the force to the supported object and a universally rotatable joint connecting said arrangement to the supporting structure that carries the combination of the supporting mechanism and, by way of this, the supported object, in which mechanism the directions of the straight lines joining in each of the arrangements the centers of rotation of the two universally rotatable joints connected to the same arrangement are such that, by means of their cooperation, the elastic and damping devices are able to exert an elastic as well as a damping force in any arbitrary direction on the supported object, and moreover, the damping arrangements are arranged in pairs in such a way that the centers of rotation of the universally rotatable joints connecting the arrangements of such a pair to the supported object either coincide or are situated at a short distance from each other, while the centers of rotation of the universally rotatable joints connecting the arrangements of the same pair to the supporting structure are situated at a substantially larger distance from each other.

Supporting mechanisms of this type are well known in the art. Their application is very important where measuring instruments or electronic or other vulnerable apparatus are to be mounted on structures that are subjected to heavy shocks and a considerable amount of vibration, such as on ships and road or rail vehicles.

A well-known mechanism of this type needs eight elastic arrangements while on every side of the supported object space for the components of the mechanism must be available, so that the application of this known mechanism requires a considerable increase in mounting space for the object. For these reasons it is impossible for adjacently situated cases for mounting electronic apparatus supported by this type of known mechanism to be mechanically coupled or even to be mounted at a small distance from each other. It can be shown that this known supporting mechanism cannot be adapted to all possible conditions, such as vibration frequencies and amplitudes while it is not very effective in suppressing rotary movements of the supported object because, in the quiescent state of the mechanism, that is in the state in which the mechanism is not subjected to shocks and vibrations, the lines along which forces are exerted on the supported object by the elastic arrangements pass either through, or at a small distance from, the center of gravity of the supported object.

Many other known supporting mechanisms show similar drawbacks. In most cases they require a larger number of elastic and damping arrangements than the smallest number that, in an effective mechanism, would suffice for a correct operation. Moreover, as a rule, these arrangements must be mounted in such places that a considerable increase in the required mounting space for the supported object is inevitable.

It is the object of the present invention to create a supporting mechanism of the type defined above that does not show the disadvantages of the known constructions. For this purpose the supporting mechanism according to the invention is built in such a way that the four straight lines each of which joins the centers of rotation of the two universally rotatable joints connected to a damping arrangement belonging to a predetermined group of four of these damping arrangements, coincide or at any rate nearly coincide with four predetermined edges of a tetrahedron constituting a closed path by being linked the one to the other, the universally rotatable joints connected to those ends of the four arrangements that are situated nearest to a certain one of the two edges of the tetrahedron to which no damping arrangement is allotted, connecting the damping arrangements to the supported object, and the universally rotatable joints connected to those ends of the four arrangements that are situated nearest to the other edge of the tetrahedron to which no damping arrangement is allotted, establishing connections with the supporting structure, and that, moreover, the direction of the straight line that joins the centers of rotation of the universally rotatable joints connected to one of the damping arrangements not allotted to an edge of the tetrahedron as well as that of the straight line that joins the centers of rotation of the universally rotatable joints connected to the other damping arrangement not allotted to an edge of the tetrahedron, differ considerably from the direction of the straight line that, in the quiescent state of the mechanism, perpendicularly intersects both edges of the tetrahedron that are not allotted to a damping arrangement, and that finally the number of elastic arrangements is also six, and that each of these elastic arrangements is so allotted to a damping arrangement that the connections of a damping arrangement and the elastic arrangement allotted thereto with the same part (either supported object or supporting structure), are either established by means of the same universally rotatable joint or by universally rotatable joints situated at a short distance from each other.

A supporting mechanism according to the invention as defined above shows the advantages enumerated below over the known constructions:

1. it requires only the minimum number of six damping and six elastic arrangements;
2. a small amount of space suffices for mounting it;
3. it permits adjacent cases for containing apparatus to be mounted at a very short distance from each other, or even to be coupled mechanically, because space for mounting the supporting mechanism is only needed at two diametrically situated sides of the supported object;
4. it is able to adapt itself to deformations of the supporting structure as well as to faulty position (resulting from mounting errors) of the universally rotatable joints connecting the elastic and damping arrangements to said structure;
5. it is possible to determine by calculation the required amount of damping and the required rigidity of the elastic arrangements when the force and the direction of the shocks, the frequencies, amplitudes and directions of the vibrations to be expected, moreover, the highest permissible accelerations, speeds and amplitudes of movement, and also the mass distribution of the supported object are known. It is possible to adapt the mechanism to practically all those circumstances that may be expected in practice; and
6. in contradistinction to various known supporting mechanisms it is perfectly able to suppress rotations of the supported object resulting from shocks and vibrations.

Very effective embodiments of constructions according to the invention are obtained if the supporting mechanism satisfies one or more of the conditions enumerated below:

a. In the quiescent state of the supporting mechanism the edges of the tetrahedron not allotted to a damping arrangement are perpendicular or at any rate nearly perpendicular to each other;
b. In the quiescent state of the supporting mechanism a predetermined principal axis of inertia of the supported object intersects both edges of the tetrahedron not allotted to a damping arrangement, or at any rate passes them at a short distance;
c. In the quiescent state of the supporting mechanism the predetermined principal axis of inertia intersects both edges of the tetrahedron that are not allotted to a damping arrangement at or near its middle, or passes them at a short distance from said middle;
d. In the quiescent state of the supporting mechanism the edges of the tetrahedron that are not allotted to a damping arrangement are perpendicular, or at any rate nearly perpendicular, to the predetermined principal axis of inertia of the supported object;

e. The predetermined principal axis of inertia mentioned above passes through the center of gravity of the supported object, or passes at a short distance from this center;

f. If the supported object, apart from the predetermined principal axis of inertia, also has two other principal axes of inertia belonging to the predetermined one, one of the two edges of the tetrahedron not allotted to a damping mechanism is parallel, or at any rate nearly parallel, to one of these other principal axes of inertia, while the other edge of the tetrahedron not allotted to a damping arrangement is parallel, or at any rate nearly parallel, to the other one of said two principal axes of inertia;

g. Each of the two damping arrangements not allotted to an edge of the tetrahedron is connected to the supported object by means of a universally rotatable joint, the center of rotation of which is situated on or at any rate in the immediate vicinity of the predetermined principal axis of inertia;

h. Each of the two lines joining the rotational centers of the universally rotatable connections of a damping arrangement not allotted to an edge of the tetrahedron is perpendicular or nearly perpendicular to the predetermined principal axis of inertia of the supported object;

i. The line joining the rotational centers of the universally rotatable connections of one of the damping arrangements not allotted to an edge of the tetrahedron and the line joining the rotational centers of the universally rotatable connections of the other damping arrangement not allotted to an edge of the tetrahedron are situated on either side of a plane through the predetermined principal axis of inertia and one of the other principal axes of inertia of the supported object which belong to the predetermined one, and form equal or at least nearly equal angles with said plane;

k. The lines joining the rotational centers mentioned under i. are symmetrically, or at any rate nearly symmetrically, situated with respect to the plane mentioned under i.; and l. At least one of the damping arrangements is combined with the elastic arrangement allotted to it to a combined arrangement able to exert a damping as well as an elastic force and connected by a single universally rotatable joint to the supported object, and by means of another single universally rotatable joint to the supporting structure.

It is an additional advantage of the mechanism according to the invention that dimensions and positions of the parts and values of the various parameters (rigidity and damping) contained within a fairly broad range will all lead to good results. Although very large deviations from the most effective dimensions, positions and values would reduce the effectiveness of the mechanism, fairly large deviations are still permissible. They reduce the effectiveness only to a restricted extent. For this reason the word "nearly" and other expressions that indicate that deviations are permissible are to be found so many times in this specification and claims as well as in the conditions enumerated above.

The invention will now be elucidated by describing various embodiments with reference to the accompanying drawings, in which.

A first embodiment of a supporting mechanism according to the invention will now be described with reference to FIG. 1. The supported object is a parallelepiped-shaped case 106 in which apparatus that is easily damageable by mechanical influences is mounted. This case is supported on a base plate 119 and a wall 120 that together constitute the supporting structure. The lines X, Y and Z are the principal axes of inertia through the center of gravity of the case containing the apparatus to be mounted in it. The case is supported by six combinations of an elastic and a damping arrangement. Each of these combinations supplies a damping force as well as a force subjected to the laws of elasticity. In the embodiment now described each elastic arrangement consists of a cylindrical helical spring, while each damping arrangement consists of a hydraulic shock absorber. Shock absorber and spring are arranged coaxially in the same way as a telescopic shock absorber for a motor car is sometimes combined with a supporting spring for the car, although in the present case the ends of the spring are fixedly connected to the ends of the shock absorber in order that tensile forces may be transmitted. The spring is actually shown in only one of the six combinations of a spring and a shock absorber (that is in the combination 114). In the remaining five combinations (101, 102, 111, 112, 113) the springs are not shown in order to simplify the drawing. Actually these springs are combined with the shock absorbers in a similar way as in the combination 114. One end of each combination is connected by means of a universally rotatable joint to the case that is to be supported, while its other end is connected by means of a second universally rotatable joint to the supporting structure. Consequently a universally rotatable joint is connected to each of the two ends of the combination.

Two of such combinations, the combinations 101 and 102, connect the upper side of the case to the wall 120. The forces supplied by these two combinations are exerted on the case at the point 105 of the principal axis of inertia Y of this case. For this purpose, one end of each of these two combinations is connected to the case by means of a universally rotatable joint, the center of rotation of which coincides with the point 105. The other end of each of these combinations is connected to the wall 120 by means of a single universally rotatable joint (103, 104). In the embodiment here described, in the quiescent condition of the supporting mechanism, the line joining the centers of rotation of the universally rotatable joints connected to a first one of the combinations 101 and 102 connected to the upper side of the case as well as the line joining the centers of rotation of the universally rotatable joints connected to the second one of these combinations, is perpendicular to the predetermined principal axis of inertia of the case. Moreover, these lines are situated on either side of the plane through said predetermined principal axis of inertia and one of the other principal axes of inertia of the case which axes belong to the predetermined one, and, as long as the mechanism is in its quiescent condition, these lines form equal angles with said plane.

Figure 8:
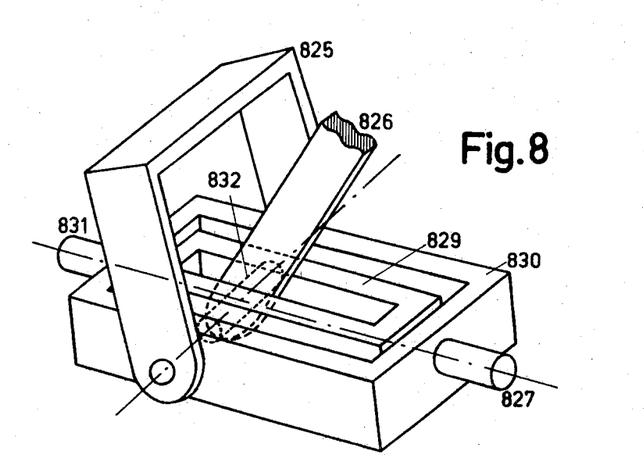
FIG. 8 shows a construction of a universally rotatable joint permitting two different objects to rotate around the same center.

At first sight it appears to be a difficult problem to build a universally rotatable joint that permits two objects to rotate around the same center of rotation. For this reason an example of an embodiment of such a concentric universally rotatable joint is shown in FIG. 8. This embodiment comprises a gimbal ring 830 carrying two journals 827 and 831 that protrude inwardly as well as outwardly. By means of the outwardly protruding parts of these journals the gimbal is rotatably connected to the object to which the double universally rotatable connection must be established, and for this reason these outwardly protruding parts of the journals are carried in bearings mounted to this object, and if the double joint is used in order to connect the combinations 101 and 102 to the case, these bearings are mounted onto said case.

The gimbal carries two other outwardly protruding journals around which a fork or strap 825 is able to rotate. This fork is connected to one of the ends of one of the combinations to be connected to the upper side of the case, for instance of the combination 101. The common center line of the journals that carry the fork intersects the common center line of the journals 827 and 831, and preferably these lines intersect perpendicularly. Then the combination connected to the fork is able to rotate with respect to the object carrying the bearings for the journals (the case) around the intersection point of these center lines. An inner gimbal ring 829 is carried by the inwardly protruding parts of the journals 827 and 831, and is able to rotate around these journals. It carries a small shaft 832, around which a bar 826 can rotate, and the center line of which intersects the common center line of the journals 827 and 831 (preferably perpendicularly) at the same point at which the latter center line is intersected by the common center line of the journals carrying the fork 825. A combination of a spring and a shock absorber connected to the bar 826 will consequently be able to rotate around the intersection point of said center lines with respect to the object carrying the bearings for the outwardly protruding parts of the journals 827 and 831.

The universally rotatable joint connecting the combinations 101 and 102 to the wall 120 need not be as complicated as the arrangement described above. There, as well as in other places where a universally rotatable connection with one single element is to be established, a simple ball and socket joint suffices. A very effective ball and socket joint is obtained if a ball bearing with spherical ball races is applied for this purpose; it shows practically no backlash and friction.

The lower end of the case 106 is carried by four combinations of a spring and a shock absorber (111—114) which connect this case to the baseplate 119. Each line joining the center of rotation of the two universally rotatable joints connected to one of these combinations of a spring and a shock absorber is arranged along an edge of a tetrahedron with the vertices 107, 108, 109, 110. The four edges of this tetrahedron with which the four lines joining the rotational centers of the universally rotatable joints belonging to said four combinations coincide, constitute a closed path by being linked the one to the other. At the point 107 the combinations 111 and 112 and at the point 108 the combinations 113 and 114 are connected to the lower end of the case 106. Moreover, at the point 110 those ends of the combinations 111 and 114 that are not connected to the case, and at the point 109 those ends of the combinations 112 and 113 that are not connected to the case, are connected to the baseplate 119. The edges 107—108 and 109—110, to which no combinations of a spring and shock absorber are allotted, are perpendicular to the principal axis of inertia Y and to each other, and said principal axis of inertia intersects each of these two edges at its middle. Moreover, the edge 107—108 is parallel to the principal axis of inertia X, while the edge 109—110 is parallel to the principal axis of inertia Z.

It is an important advantage of this construction over many other known constructions that, apart from the universally rotatable joints connecting the upper combinations 101 and 102 to the wall 120, all combinations of a spring and a shock absorber can be arranged completely within a parallelepiped-shaped space with the same cross section perpendicular to the principal axis of inertia Y as the case 106 and that the height in the direction of the principal axis of inertia Y required for accomodating the supporting mechanism is small so that the height of the case need not be much smaller than that of the space available for accomodating it.

It is a further advantage of the embodiment described above as well as of other embodiments of the supporting mechanism according to the invention that mounting errors leading to faulty positions of the universally rotatable joints as well as deformations of the supporting structure will not or only slightly influence the forces in the springs or other elastic arrangements. In the embodiment shown in FIG. 1 the case is able to rotate freely around the axes 107—108 and 109—110 with different directions, so that, without causing additional forces in the combinations connected to the case, the point 105 may be swung to such a position, that, at this point the front ends of the combinations 101 and 102 can both be connected to the case.

Other embodiments of supporting mechanisms according to the invention show a similar freedom of movements so that deformations of the supporting structure and mounting errors will not cause additional forces in the elastic arrangements of these embodiments either.

It is possible for adjacent cases supported by mechanisms according to the invention to be mounted at a very small distance from each other; it has even been established that adjacent cases supported by supporting mechanisms according to the invention can be coupled mechanically without causing an increase worth mentioning in the transmission of shocks and vibrations. Mechanically coupling adjacent cases makes it more easy to establish electrical connections between electric apparatus mounted in these cases. Supporting mechanisms for mechanically coupled cases must be mounted with extra care, however, for the freedom of motion that permits cases that are not coupled to other cases, to adapt themselves to deformations of the supporting structure and errors in mounting the universally rotatable joints, will get lost for the greater part when the cases are coupled.

By means of relatively simple calculation such values for the rigidity of the elastic arrangements (such as the springs) and for the amount of damping caused by the damping arrangements can be established, that:

1. the transmission to the supported object of vibrations of the supporting structures with frequencies within a predetermined range is substantially suppressed,
2. the displacements and accelerations of the supported object resulting from heavy shocks to which the supporting mechanism is subjected remain within predetermined limits, and
3. shocks and vibrations to which the supporting mechanism is subjected will not lead to the exertion of torques on the supported object able to cause rotations worth mentioning thereof.

It is by no means necessary for the supported object (the case in the embodiment described) to be supported by four combinations of an elastic arrangement and a damping arrangement connected to its lower side and to be kept in the correct direction by means of two such combinations connected to its upper side. The mechanism may be reversed in such a way that the supported object is suspended by means of four combinations of an elastic and a damping arrangement connected to the upper side of the object and kept in the correct direction by means of two such combinations connected to the lower side of the object. Furthermore it is by no means necessary for the principal axis of inertia to be vertical. As a matter of fact there are no restrictions for the direction of said principal axis of inertia and the same is valid for the directions of the other two principal axes of inertia, X and Z, of the supported object. The reversal and the change in direction mentioned above are not only permissible in those cases in which the symmetrical embodiment described or other, in principle, also symmetrical embodiments are used but also when the nonsymmetrical embodiments to be described below are applied.

The complete symmetry of the mechanism described above with reference to FIG. 1 shows the important advantage that the four combinations of an elastic and a damping arrangement which support the object at its one end can be equal to each other and that moreover the two combinations that are connected to the other end of the object can also be equal, although, as a rule, not equal to the four other combinations. This advantage will not get lost if, in the design of the mechanism, certain liberties to be described below have been taken in connection with the positions of the combinations or of the elastic and damping arrangements.

The correct operation of a mechanism according to the invention will not be influenced unfavorably if the combinations arranged along the edges of the tetrahedron have been shifted lengthwise along these edges, and/or the length of these combinations between the centers of rotation of their universally rotatable joints has been changed. This makes it possible to situate said centers of rotation beyond the vertices of the tetrahedron and, in this way, to avoid the application of the complicated concentric universally rotatable joints which make it possible for two parts to effect universal rotation around the same point with respect to a third one. Each end of a combination can then be connected to the supported object or to the supporting structure by means of its own universally rotatable joint (such as a ball and socket joint).

Figure 2:
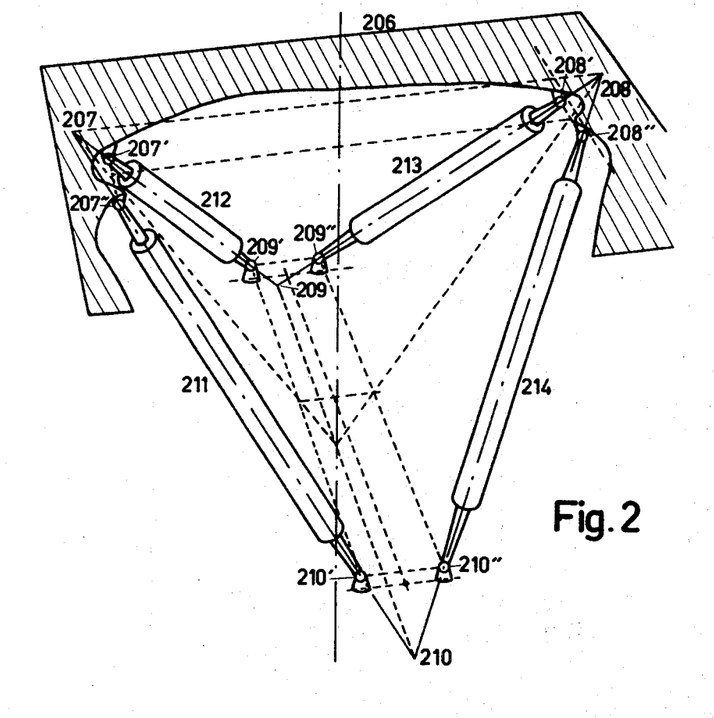
FIG. 2 shows an alternative construction for a part of such a mechanism.

FIG. 2 shows a first embodiment of a mechanism according to the invention in which the use of said concentric universally rotatable joints is avoided. This figure shows, instead of the complete case, only the partially removed bottom wall 206 of this case that constitutes the supported object.

Four combinations of a spring and a shock absorber (211, 212, 213, 214) support the case at that side. The centers of rotation of a pair of universally rotatable joints connected to each of these four combinations of a spring and a shock absorber are situated on an edge of a tetrahedron with the vertices 207, 208, 209, 210 to which edge said combination is allotted. The position of the tetrahedron with respect to the three principal axes of inertia through the center of gravity of the supported object satisfies the same conditions as the position of the tetrahedron 107, 108, 109, 110 in FIG. 1. The distance between the centers of rotation of the universally rotatable joints connected to such a combination is, however, smaller than the distance between the vertices of the tetrahedron situated on the same edge of that tetrahedron and the former distance is so much smaller than the latter that sufficient space becomes available to apply separate universally rotatable joints such as separate ball and socket joints, for connecting the ends of the combinations of a spring and a shock absorber to the supported object and the supporting structure. In connection therewith the combination 211 is provided with the separate universally rotatable joints 207″ and 210′, the combination 212 with the separate universally rotatable joints 207′ and 209′, the combination 213 with the separate universally rotatable joints 208′ and 209″ and the combination 214 with the separate universally rotatable joints 208″ and 210″. In the embodiment shown in FIG. 2 the center of rotation of the joints situated near the lower wall of the case are situated at the same distance from the vertices 207 and 208 respectively and therefore, from the lower wall of the case. Moreover, in said embodiment, the centers of rotation of the joints connecting the combinations to the supporting structure are situated at the same distance from the vertices 209 and 210 respectively and therefore at the same distance from the base plate. For this reason the same universally rotatable joints with the same dimensions can be used for the purpose of connecting the four combinations of a spring and a shock absorber to the supported object as well as to the supporting structure. In the embodiment shown in FIG. 2 such joints with equal dimensions have actually been applied for this purpose.

Figure 7:
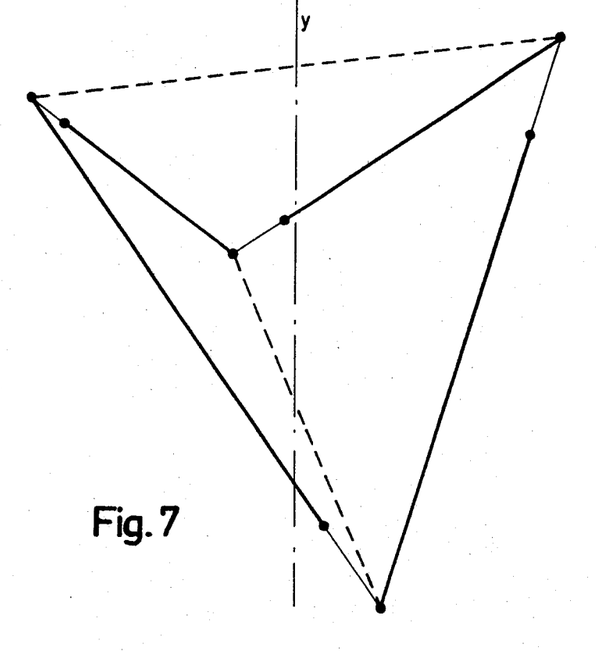
FIG. 7 shows an alternative arrangement of a part of a supporting mechanism according to the invention.

In order to obtain symmetrically arranged forces it is by no means necessary for the four combinations arranged along the edges of the tetrahedron to be in similar positions with respect to the vertices of the tetrahedron. It remains permissible for the centers of rotation of the joints belonging to the same combination to be shifted along the edge of the tetrahedron on which they are situated even when these displacements are not equal for all combinations. FIG. 7 shows schematically an example of an embodiment resulting from such unequal displacements of the four combinations arranged along the edges of a tetrahedron. This embodiment does not require concentric universally rotatable joints either. Each end of each combination of an elastic and a damping arrangement is connected to a separate universally rotatable joint, such as a ball and socket joint, for which purpose sufficient space is available in the embodiment shown in FIG. 7.

Embodiments according to the invention may also be obtained by greater displacements of the combinations in the one or the other direction. In many cases, however, it will be impossible to lodge the supporting mechanisms thus obtained in the space obtained by continuation of the walls of the case.

Figure 1:
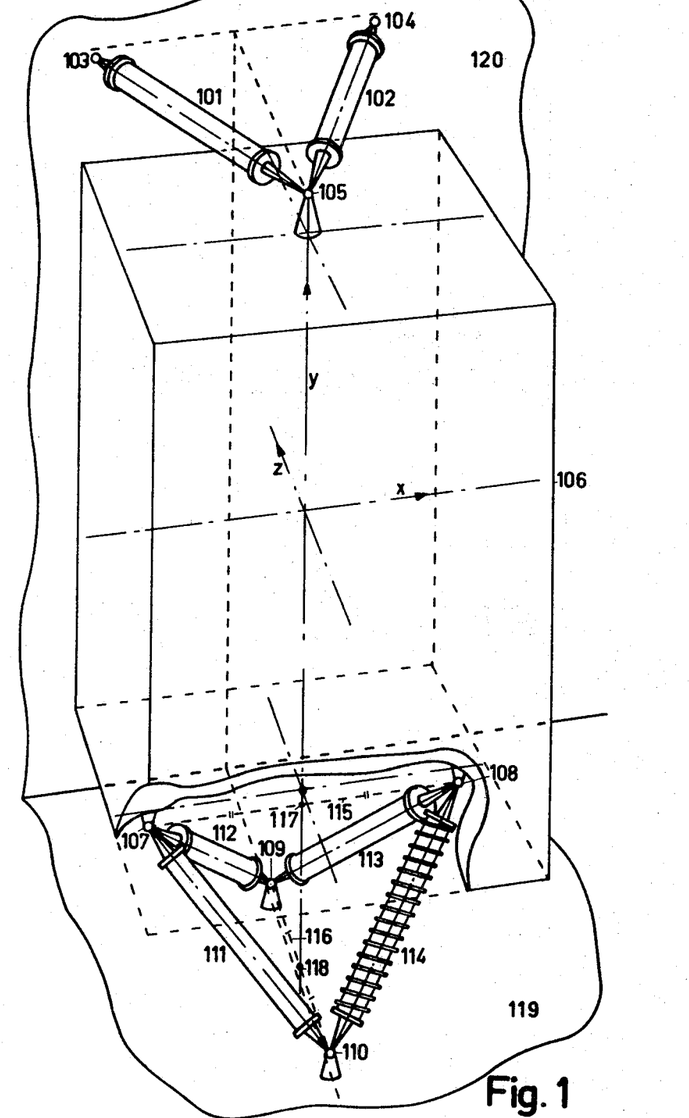
FIG. 1 shows a supporting mechanism according to the invention for supporting a case for containing technical apparatus.

It is, furthermore, not absolutely necessary, even in a symmetrically arranged mechanism, for each of the two lines, each joining the centers of rotation of the universally rotatable joints connected to one of the two combinations of an elastic and a damping device, situated near the upper side of the case 106 in FIG. 1, to be exactly perpendicular to the principal axis of inertia Y. Considerable deviations from this position are fully permissible and if there is a preferential direction for heavy shocks exerted on the supporting mechanism it may be advantageous for the direction of these lines in the quiescent position of the mechanism to be such that, as a result of a heavy shock in the preferential directions said lines swing in the direction to the position perpendicular to said principal axis of inertia and then through this position. Substantial changes in the direction of the principal axis of inertia Y as a result of the swinging movements of the upper combinations of an elastic and a damping arrangement will then be less probable.

Within the scope of the invention it is furthermore permissible to displace said upper combinations of an elastic and a damping device in such a way that the centers of rotation of the universally rotatable joints connected to such a combination are shifted along the straight line on which they are situated, said displacement being, if necessary, combined with a change in the distance between the centers of rotation of the universally rotatable joints connected to the same combination. This makes it possible to avoid the application of concentric universally rotatable joints as means for connecting the upper combinations to the case.

Figure 3:
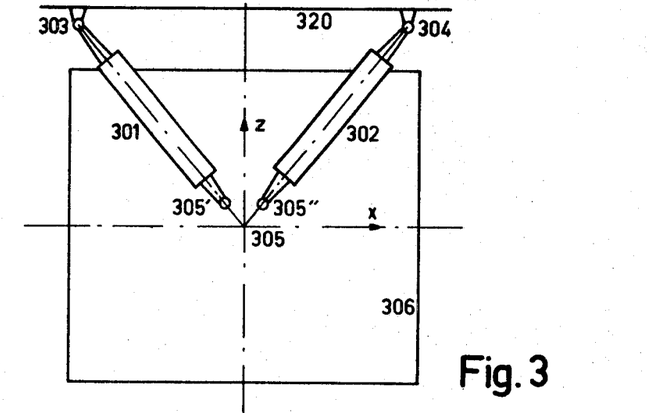
FIG. 3 shows an alternative construction for another part of such a mechanism.

FIG. 3 shows a top view of a supporting mechanism that has been simplified in this way. Part 306 in this figure is the upper side of the supported case. The parts 301 and 302 are the two combinations of an elastic and a damping arrangement, that are connected to said upper side. By means of universally rotatable joints they are connected to the wall 320. At the point 305 the principal axis of inertia Y through the center of gravity of the case intersects the two lines, each joining the centers of rotation of the two universally rotatable joints connected to one of the two combinations 301 and 302. At the point 305′ the combination 301 is connected to the upper side 306 of the case and at the point 305″ the combination 302. Separate universally rotatable joints, in this case separate ball and socket joints, establish these connections. Within the scope of the invention it is, moreover, permissible to displace one of the combinations of an elastic and a damping arrangement connected to the upper side of the supported object to such an extent that after the displacement, it will be situated at the opposite side of the principal axis of inertia Y through the center of gravity of the supported object or to rotate the set of two combinations of an elastic and a damping arrangement around the principal axis of inertia Y through an angle of 90° while adapting the angle between the combinations to the new situation. It is also possible, within the scope of the invention, to rotate the tetrahedron 107, 108, 109, 110, whose edges determine the positions of the combinations of an elastic and a damping arrangement supporting the lower end of the case, through an angle of 90° around said principal axis of inertia.

It is undesirable for the distance between the center of rotation of a universally rotatable joint connecting one of the combinations of an elastic and a damping arrangement not allotted to an edge of the tetrahedron and said principal axis of inertia Y to become too great as a result of the displacements mentioned above. If said distance exceeds a certain limit displacements of the supported object resulting from heavy shocks might cause the intersection point of the lines on which the centers of rotation of the universally rotatable joints of said combinations are situated to remove itself too far from the principal axis of inertia mentioned above or even to cause these lines not to remain intersecting lines and no longer to intersect said axis of inertia.

The changes in the positions of the lines mentioned above make it possible for the damping arrangements or the combinations of an elastic and a damping arrangement not allotted to an edge of the tetrahedron to exert a torque around the predetermined principal axis of inertia Y on the supported object and thus to cause undesirable rotations of said object.

For similar reasons it is undesirable for the distance between a center of rotation of a universally rotatable joint connected to a damping arrangement or to a combination of an elastic and a damping arrangement whose position is determined by an edge of the tetrahedron on the one hand and the vertex of the tetrahedron that is nearest to this center of rotation and situated on the same edge of the tetrahedron on the other hand, to exceed a predetermined value.

It has already been told that the two principal axes of inertia of the supported object, passing through its center of gravity and belonging to the predetermined principal axis of inertia Y determine the position of the tetrahedron and the directions of the two damping arrangements or of the two combinations of an elastic and a damping arrangement not allotted to an edge of the tetrahedron. It should be noted, however, that said two principal axes of inertia X and Z in certain cases are not present. They are absent if the moments of inertia around all axes through the center of gravity of the supported object and perpendicular to the axis Y all have the same value. The tetrahedron as well as said arrangements or combinations can then be orientated arbitrarily around said predetermined principal axis of inertia Y.

In practice such an arbitrary orientation is also permissible if the principal axes of inertia X and Z are present but the difference between the moments of inertia around these axes is small.

The various rules enumerated above permit the determination of the most favorable positions of the various parts of the supporting mechanisms according to the invention. It is, however, by no means necessary for the positions of these parts to correspond exactly to the most favorable ones. Satisfactory operation will be obtained within a fairly broad range of positions around the most favorable ones. The deviations from the most favorable positions enumerated below will not cause an increase worth mentioning in the transmission of shocks and vibrations to the supported object:

1. It is permissible for the direction of the line joining the centers of rotation of the two universally rotatable joints connected to a damping arrangement or a combination of such an arrangement and an elastic arrangement to differ to a certain extent from the direction of the line (such as the edge of a tetrahedron) with which, according to the rules, said first mentioned line should coincide;
2. It is permissible for said line joining said centers of rotation to be displaced to a certain extent in a direction transverse to the line with which, according to the rules, said first mentioned line should coincide;
3. It is not necessary for the intersection point of the lines joining the centers of rotation of the universally rotatable joints connected to the damping arrangements or to the combinations of an elastic and a damping arrangement not allotted to an edge of the tetrahedron, to be situated on the predetermined principal axis of inertia Y. It suffices that the distance between said intersection point and said axis is not too large. It is even permissible for those lines not to intersect but to pass each other and the principal axis of inertia Y at not too great a distance; and
4. It is permissible for the directions of the lines joining the centers of rotation mentioned under 3 to differ from the most favorable directions determined in connection with the properties of the object to be supported.

It is, furthermore, permissible for the directions of the two edges of the tetrahedron, to which no damping arrangements or combinations of an elastic and a damping arrangement are allotted to differ substantially from:
a. the direction perpendicular to the predetermined principal axis of inertia Y of the supported object, and
b. the directions parallel to one of the other two principal axes of inertia of the object passing through its center of gravity and belonging to the predetermined principal axis of inertia Y.

It is also permissible for these edges not to intersect the predetermined principal axis of inertia Y but to pass this axis at a restricted distance and if they do intersect said axis of inertia, for the intersection points not to coincide with the middle of these edges.

The fact that restricted deviations from the rules related to the positions and dimensions of the various parts of the supporting mechanisms are permissible has many advantages. It permits, for instance, the use of a standard type of supporting mechanism for supporting cases containing different sets of devices although the positions of the center of gravity and of the principal axes of inertia through this center as well as the values of the moments of inertia around said axes differ. Nevertheless, provided that these differences are not too large, the same supporting mechanism can be used for these cases.

It may be considered as a further advantage resulting therefrom that the application of a coaxial arrangement of a spring and a shock absorber can be avoided by taking simple measures. The coaxial arrangement has various disadvantages. It is, for instance, difficult to maintain and service such a coaxial combination.

It would be possible to arrange spring and shock absorber side by side in a combination that is connected by one universally rotatable joint to the supported object and by another universally rotatable joint to the supporting structure, but such a combination must be provided with a straight line guide which is subjected to friction and wear. The fact, however, that it is possible for the elastic and damping arrangements to be shifted to a certain extent in a direction transverse to the lines with which, according to the rules, they should coincide, makes it possible to arrange the damping arrangement and the elastic arrangement allotted thereto side by side and to connect each of these arrangements by means of its own universally rotatable joints to the supported object and to the supporting structure.

Figure 4:
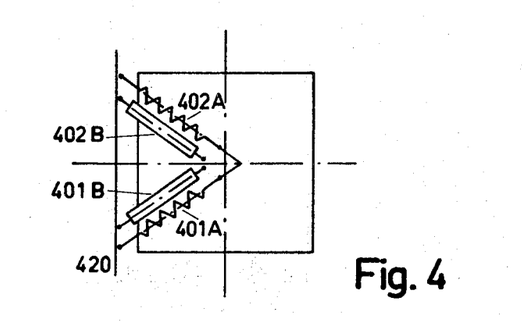
FIGS. 4, 5 and 6 show an alternative construction of a complete supporting mechanism according to the invention.
Figure 5:
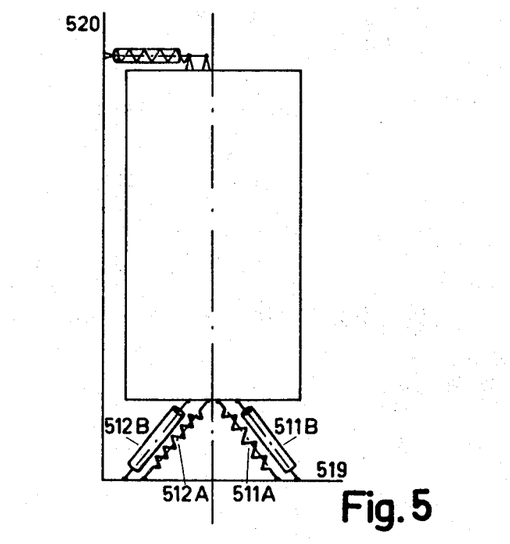
Figure 6:
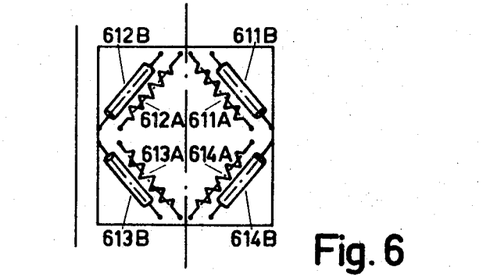

FIGS. 4, 5 and 6 show an embodiment of the invention in which the damping arrangements and the elastic arrangements are separately mounted in this way. The object supported by the supporting mechanism shown in these FIGS. is also a case for mounting apparatus of the type carried by the supporting mechanism shown in FIG. 1. FIG. 4 shows a top view of the case and certain parts of the supporting mechanism. The upper side of the case is connected to two shock absorbers 401B and 402B and to two springs 401A and 402A. Each spring and each shock absorber is connected to a universally rotatable joint such as a ball and socket joint at either end. At one end these joints connect these springs and shock absorbers to the wall 420 and at the other end these joints connect the springs and shock absorbers to the supported object, that is to the upper side of the case. In the embodiment shown in the FIG. the shock absorber and the spring allotted thereto are situated on either side of the line on which, according to the rules, the centers of rotation of the universally rotatable joints connected to a combination of a shock absorber and a spring would have been situated. It would also be possible to situate the centers of rotation of the universally rotatable joints connected to one of the two arrangements allotted to each other on the line on which the centers of rotation of the joints connected to a combination of an elastic and a damping arrangement would have to be situated and to situate the other arrangement in the immediate vicinity thereof in which case the direction of the displacement of the latter arrangement with respect to the former can be arbitrarily selected. The intersection points of the lines on which the centers of rotation of the joints connected to arrangements of the same type are situated can be situated on the predetermined principal axis of inertia Y or in the immediate vicinity thereof.

FIG. 5 and 6 show an elevation and a bottom view of the supporting mechanism of the same case. FIG. 5 shows only two of the springs 511A and 512A and two of the shock absorbers 511B and 512B, all connected to the lower side of the case while FIG. 6 shows all four springs (611A, 612A, 613A, 614A) connected to the lower side of the case and all four shock absorbers (611B, 612B, 613B, 614B) connected to the lower side of the case. Each spring is situated in the immediate vicinity of the shock absorber to which it is allotted and both are arranged more or less parallel to and in the immediate vicinity of the edge of the tetrahedron to which the shock absorber is allotted. Each shock absorber and each spring is connected by means of its own universally rotatable joints to the supported object (the case) and to the base plate 519, 619 that is part of the supporting structure. Experience has shown that this type of supporting mechanism according to the invention is very effective.

It needs no elucidation that in embodiments in which the elastic and the damping arrangements are connected by means of separate universally rotatable joints to the supported object and the supporting structure the same liberties with respect to the situation and directions of these arrangements are permissible as in the embodiments in which these arrangements are part of combinations.

In the above specification it has been presumed for simplicity's sake that the elastic and the damping arrangements, also when they are combined to combinations, are always separate and independent devices, and that these separate devices are built in such a way that a device of the one type can only supply a damping force and a device of the other type can only supply an elastic force, such as a shock absorber and a spring. It is, however, possible to build an arrangement that supplies, between two universally rotatable joints connected thereto, a force that is the sum of an elastic and a damping force although it does not consist of a separate damping arrangement and a separate elastic arrangement. Such arrangements are well known in the automotive industry and are applied, for instance, in the heavier type of Citroen cars and in the front wheel driven cars of the British Motors Corporation. Similar constructions can be used in supporting mechanisms according to the invention.

In all supporting mechanisms according to the invention displacements of the supported object caused by heavy shocks and vibrations will not reduce the attenuating influence of the mechanism on other shocks and vibrations.

I claim:

1. A supporting mechanism for an object having first and second opposing surfaces and an axis passing through said surfaces, comprising a support having third and fourth surfaces; at least six support members each having a longitude axis and two ends and comprising a means for supplying a restoring force upon movement from a neutral position and means for damping said restoring force means; two of said members each having one end located proximate said first surface and the other end proximate third surface, said two members being disposed with said respective longitudinal axes noncoincident with said object axis, the remaining members each having one end located proximate said second surface and the other end proximate said fourth surface, said remaining members being disposed in a closed path substantially along four edges out of the six edges a tetrahedron, one of said unused edges being adjacent said second surface, the remaining one of said unused edges being adjacent said fourth surface, and a plurality of universal joints each being connected to an end of said members and the surface proximate said end.

2. Supporting mechanism as claimed in claim 1, wherein the two edges of the tetrahedron that are not allotted to a support member are substantially perpendicular to each other.

3. Supporting mechanism as claimed in claim 1 wherein a predetermined principal axis of inertia of the supported object substantially intersects both edges of the tetrahedron that are not allotted to said members.

4. Supporting mechanism as claimed in claim 3, wherein said principal axis of inertia intersects both edges of the tetrahedron that are not allotted to said members substantially in their middle.

5. Supporting mechanism as claimed in claim 3, wherein the predetermined principal axis of inertia is nearly perpendicular to both edges of the tetrahedron that are not allotted to said members.

6. Supporting mechanism as claimed in claim 3, wherein said principal axis of inertia passes substantially through the center of gravity of the supported object.

7. Supporting mechanism as claimed in claim 3, wherein the two other principal axes of inertia through the center of gravity of the supported object are nearly parallel to the two edges of the tetrahedron that are not allotted to a member respectively.

8. Supporting mechanism as claimed in claim 3, wherein each of the two members that are not allotted to an edge of the tetrahedron is universally rotatably connected to the supported object at a point substantially near the predetermined principal axis of inertia of the object.

9. Supporting mechanism as claimed in claim 3, wherein the line that joins the centers of rotation of the universally rotatable joints connected to the two members that are not allotted to an edge of the tetrahedron are nearly perpendicular to the predetermined principal axis of inertia of the supported object.

10. Supporting mechanism as claimed in claim 3, wherein the line that joins the centers of rotation of the two universally rotatable joints belonging to the two members that are not allotted to an edge of the tetrahedron form equal angles with the plane that passes through said predetermined principal axis of inertia and one of two other principal axes of inertia and are situated on either side of this plane.

11. Supporting mechanism as claimed in claim 10, wherein said lines joining the centers of rotation of the universally rotatable joints are symmetrically situated with respect to said plane.

12. Supporting mechanism as claimed in claim 1 wherein at least one of the damping means is coupled with the respective restoring force means allotted thereto, that a member is obtained that is connected to the supported object by means of a first universally rotatable joint and to the supporting structure by means of a second universally rotatable joint.

PO-1050
(5/69)

UNITED STATES PATENT OFFICE
CERTIFICATE OF CORRECTION

Patent No. 3,540,688          Dated November 17, 1970

Inventor(s) ANTONIUS MARIA SCHULTE

It is certified that error appears in the above-identified patent and that said Letters Patent are hereby corrected as shown below:

IN THE TITLE PAGE below "Patented" insert -- Assignee: N.V. Hollandse

Signaalapparaten --;

Signed and sealed this 17th day of December 1974.

(SEAL)
Attest:

McCOY M. GIBSON JR.          C. MARSHALL DANN
Attesting Officer          Commissioner of Patents